(12) United States Patent  
Wigren

(10) Patent No.: US 9,794,891 B2  
(45) Date of Patent: Oct. 17, 2017

(54) METHOD AND APPARATUS RELATING TO INTERFERECE ESTIMATION IN CELLULAR COMMUNICATION NETWORKS

(71) Applicant: TELEFONAKTIEBOLAGET L M ERICSSON (PUBL), Stockholm (SE)

(72) Inventor: Torbjörn Wigren, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 92 days.

(21) Appl. No.: 14/770,359

(22) PCT Filed: Mar. 24, 2014

(86) PCT No.: PCT/SE2014/050356  
§ 371 (c)(1),  
(2) Date: Aug. 25, 2015

(87) PCT Pub. No.: WO2014/148998  
PCT Pub. Date: Sep. 25, 2014

(65) Prior Publication Data  
US 2016/0007301 A1 Jan. 7, 2016

Related U.S. Application Data

(60) Provisional application No. 61/804,358, filed on Mar. 22, 2013.

(51) Int. Cl.  
*H04W 4/00* (2009.01)  
*H04W 52/24* (2009.01)  
(Continued)

(52) U.S. Cl.  
CPC ........ *H04W 52/244* (2013.01); *H04B 17/309* (2015.01); *H04B 17/318* (2015.01); *H04B 17/345* (2015.01); *H04W 52/343* (2013.01)

(58) Field of Classification Search  
CPC ............. H04W 52/244; H04W 52/241; H04W 52/343; H04B 17/309; H04B 17/318; H04B 17/345; H04B 17/34  
(Continued)

(56) References Cited

U.S. PATENT DOCUMENTS 7,912,461 B2    3/2011    Wigren  
8,175,537 B2 *  5/2012    Wigren ................ H04B 17/26  
                                          455/226.3

(Continued)

FOREIGN PATENT DOCUMENTS

SE    WO 2013/043093 A1 *  3/2013  ............ H04W 72/14  
WO    WO 2007/024166 A1    8/2005  
(Continued)

OTHER PUBLICATIONS

Wigren, et al. Estimation of Uplink WCDMA Load in a Single RBS. Proc. IEEE VTC-2007 Fall, Baltimore, MD, USA, Oct. 1-3, 2007.  
(Continued)

*Primary Examiner* — William Nealon

(57) ABSTRACT

The present invention pertains to methods and devices relating to neighbor cell interference estimation and handling in cellular communication networks. According to one aspect, there is provided a method for interference handling performed in a radio network node for a cellular communication network. The method comprises measuring a received total wideband power, RTWP, and a load utilization experienced at the radio network node. The method further comprises performing a vector estimation of neighbor cell interference experienced at the radio network node based on the measured RTWP and the measured load utilization. The vector estimation comprises decomposition into at least two scalar component estimations. The method may further comprise obtaining and using tabulated computation support information, which is used when performing the vector estimation of neighbor cell interference. According to another aspect, there is provided a radio network node adapted to perform the method.

12 Claims, 5 Drawing Sheets

(51) Int. Cl.
  *H04W 52/34*    (2009.01)
  *H04B 17/309*   (2015.01)
  *H04B 17/318*   (2015.01)
  *H04B 17/345*   (2015.01)

(58) Field of Classification Search
  USPC .............................. 455/422.1, 226.1, 67.13
  See application file for complete search history.

(56) References Cited

U.S. PATENT DOCUMENTS

| | | | | |
|---|---|---|---|---|
| 2009/0149134 A1* | 6/2009 | Gunnarsson | ........ | H04W 52/241 455/69 |
| 2011/0195731 A1* | 8/2011 | Jang | .................... | H04W 52/243 455/501 |
| 2012/0147765 A1* | 6/2012 | Wigren | ............... | H04W 52/146 370/252 |
| 2014/0112164 A1 | 4/2014 | Wigren et al. | | |

FOREIGN PATENT DOCUMENTS

| WO | WO 2008/004924 A1 | 1/2008 |
|---|---|---|
| WO | WO 2013/170465 A1 | 11/2013 |
| WO | WO 2014/081362 A1 | 5/2014 |

OTHER PUBLICATIONS

Wigren. Soft Uplink Load estimation in WCDMA. IEEE Trans Veh. Tech., Mar. 2009.
Wigren. Recursive Noise Floor Estimation in WCDMA. IEEE Trans. Veh. Tech., vol. 59, No. 5, pp. 2615-2620, 2010.

* cited by examiner

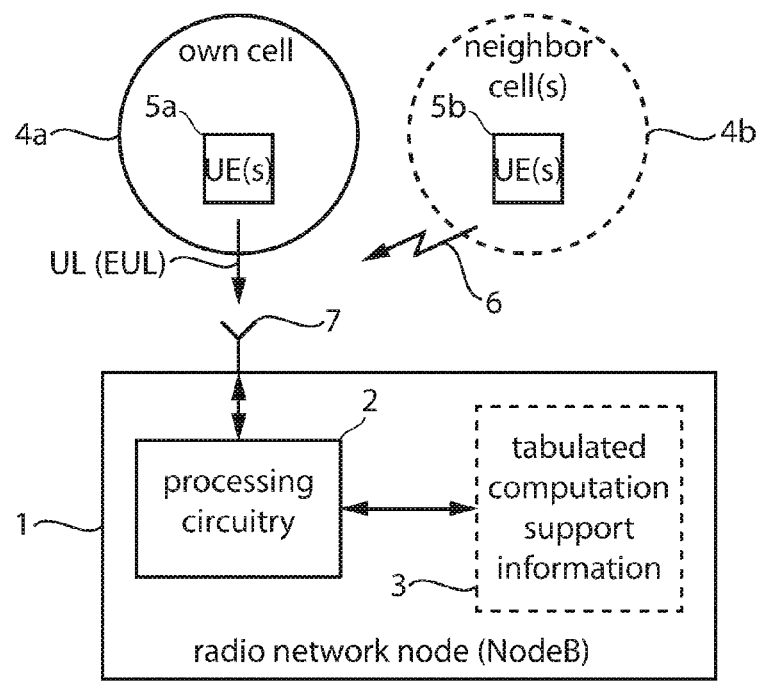
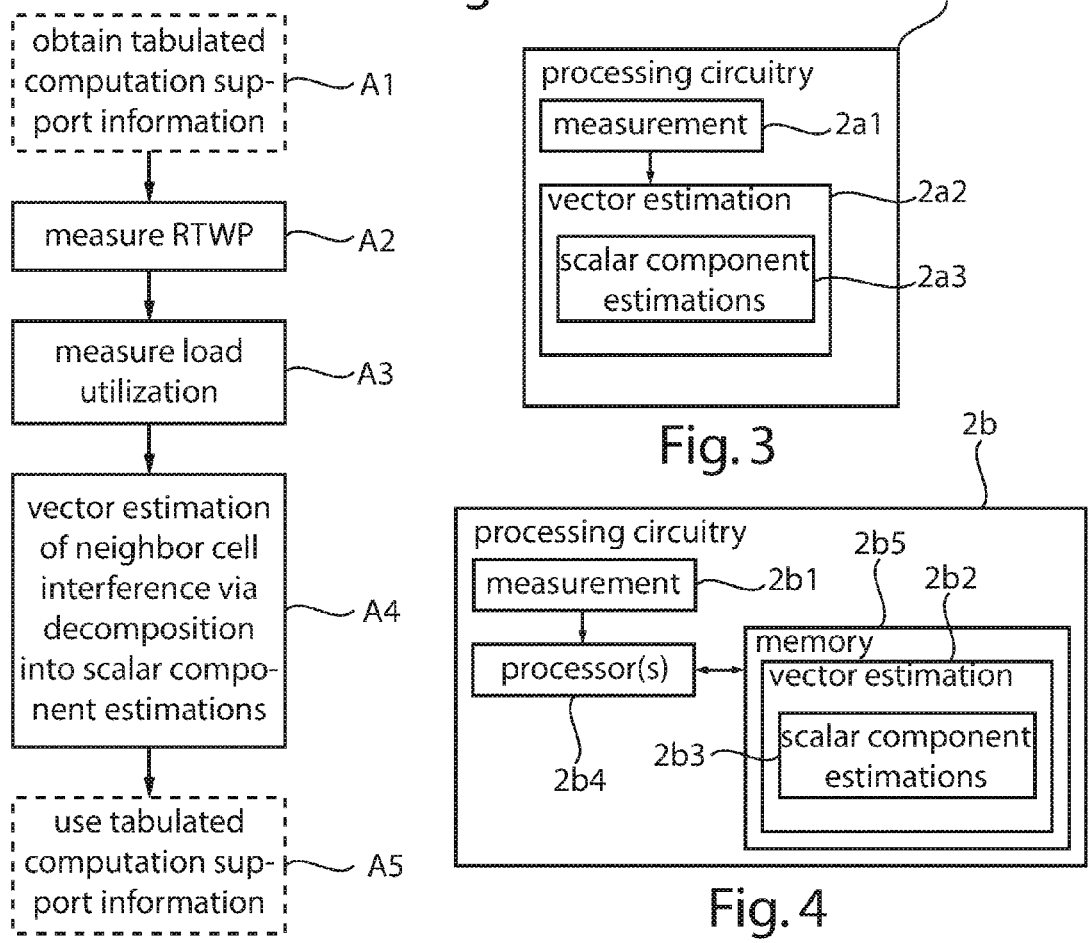

| Table size | RMS neighbour cell error wrt true value [dB] | RMS neighbour cell interference inaccuracy wrt true value [%] |
|---|---|---|
| No table (infinite) | 8.24 | 15.00 |
| 1024 | 8.77 | 13.27 |
| 512 | 9.00 | 12.59 |
| 256 | 8.89 | 12.91 |
| 128 | 9.11 | 12.27 |
| 64 | 8.69 | 13.52 |

METHOD AND APPARATUS RELATING TO INTERFERECE ESTIMATION IN CELLULAR COMMUNICATION NETWORKS

This application claims the benefit of U.S. Provisional Application No. 61/804,358, filed Mar. 22, 2013, the disclosure of which is fully incorporated herein by reference.

TECHNICAL FIELD

The present invention pertains in general to the field of interference handling in cellular communication networks; and in particular to the part of this field that is concerned with neighbour cell interference estimation.

BACKGROUND

Today mobile broadband traffic is exploding in cellular networks such as, for example, WCDMA (Wideband Code Division Multiple Access) networks. A technical consequence is a corresponding steep increase of interference in these networks, or equivalently, a steep increase of a load. This makes it important to exploit any load headroom that is left in the most efficient way.

Moreover, cellular networks are becoming more heterogeneous, with macro radio base stations (RBSs) being supported by micro and pico RBSs at traffic hot spots. Also, home base stations (femto RBSs) are emerging in many networks.

Heterogeneous networks (HetNets) concern effects associated with networks where different kinds of cells are mixed. These cells may have different radio properties in terms of e.g.

Radio sensitivity
Frequency band
Coverage
Output power
Capacity
Acceptable load level.

This can be an effect of a use of different RBS sizes (macro, micro, pico, femto), different revisions (different receiver technology, software quality), different vendors and of the purpose of a specific deployment.

One important factor in HetNets is that of air interface load management, i.e. the issues associated with the scheduling of radio resources in different cells and the interaction between cells in terms of inter-cell interference. Hereinafter, the terms inter-cell interference and neighbor cell interference will be used interchangeably.

As an example, one can consider a low power cell with limited coverage intended to serve a hotspot. In order to get a sufficient coverage of the hot spot, an interference suppressing receiver like the G-rake+ may be used. The low power cell may further be located in the interior of but still close to a boundary of a specific macro cell. Further, surrounding macro cells will interfere with the low power cell rendering a high level of neighbor cell interference in the low power cell. Despite the advanced receiver, this may unacceptably reduce the coverage in the hot spot. As a result, users of the hot spot tend to connect to the surrounding macro cells instead, thereby further increasing the neighbor cell interference experienced by the low power cell.

From this discussion it should be clear that it would be advantageous if a control node, such as a radio network controller (RNC) or the surrounding RBSs could be informed of an interference situation and take action, using e.g. admission control in the RNC or new functionality in the surrounding RBSs to reduce inter-cell interference and to provide a better management of, for example, hot spot traffic—in terms of air interface load.

It follows that estimation of the neighbour cell interference at a node such as an RBS is a crucial component in the handling of interference.

Neighbor cell interference estimation as such based on uplink power measurements is, for example, described in T. Wigren, "Soft uplink load estimation in WCDMA", IEEE Trans Veh. Tech., March, 2009; and in WO2007/024166; and also in U.S. Pat. No. 7,912,461.

These teachings rely on estimation by means of a high order vector estimator of a Kalman filtering type. Kalman filtering is a specific type of algorithm useful when filtering is performed on dynamic systems modelled by state vectors. For example, Kalman filtering is optimal when a dynamic state model is linear and when an input signal can be modelled with Gaussian stochastic processes. However, this results in a very high computational complexity, which puts a corresponding high demand on processing power in the RBSs.

With the above-mentioned HetNet trend, a significant parameter is a cost of the new smaller nodes. In particular, implementation of new functionality, such as support of interference control, needs to be done without a need for excessive processing power in the nodes.

Consequently, there is a need for a provision of ways and means for reduction of the processing demand associated with neighbor cell interference handling/estimation.

SUMMARY

According to one aspect, the above-indicated problem is solved with a method for interference handling. The method is performed in a radio network node for a cellular communication network. The method comprises measuring a received total wideband power, RTWP, and a load utilization experienced at the radio network node. The method further comprises performing a vector estimation of neighbor cell interference experienced at the radio network node based on the measured RTWP and the measured load utilization. The vector estimation comprises decomposition into at least two scalar component estimations.

In exemplary embodiments, the method may further comprise obtaining tabulated computation support information, which is used when performing the vector estimation of neighbor cell interference.

According to another aspect, the above-stated problem is solved with a radio network node for a cellular communication network, wherein the radio network node comprises processing circuitry, which is configured to measure a received total wideband power, RTWP, and a load utilization, both experienced at the radio network node. Moreover, the processing circuitry is configured to perform a vector estimation of neighbour cell interference experienced at the radio network node based on the measured RTWP and the measured load utilization such that the vector estimation comprises a decomposition into at least two scalar component estimations.

In exemplary embodiments, the processing circuitry may be further configured to obtain tabulated computation support information and to use the tabulated computation support port information during the performance the vector estimation of neighbor cell interference.

A main advantages with the scalar component estimations is that these are computationally optimised in the sense that certain superfluous operations has been removed from the outset, as will explained in greater detail later.

A main advantage with the computation support information is that calculation of tabulated quantities can be avoided or greatly simplified.

The invention will now be described further using exemplary embodiments and referring to the drawings. The persons skilled in the art will appreciate that further objects and advantages may be associated with these exemplary embodiments.

BRIEF DESCRIPTION OF THE DRAWINGS

FIG. 1 is a block diagram illustrating, according to an exemplary embodiment, a radio network node for a cellular communication network.

FIG. 2 is a flowchart illustrating, according to an exemplary embodiment, a method of neighbor cell interference estimation.

FIG. 3 is a block diagram illustrating, according to an implementation example, processing circuitry for a radio network node.

FIG. 4 is a block diagram illustrating, according to another implementation example, processing circuitry for a radio network node.

DETAILED DESCRIPTION

Figure 5:
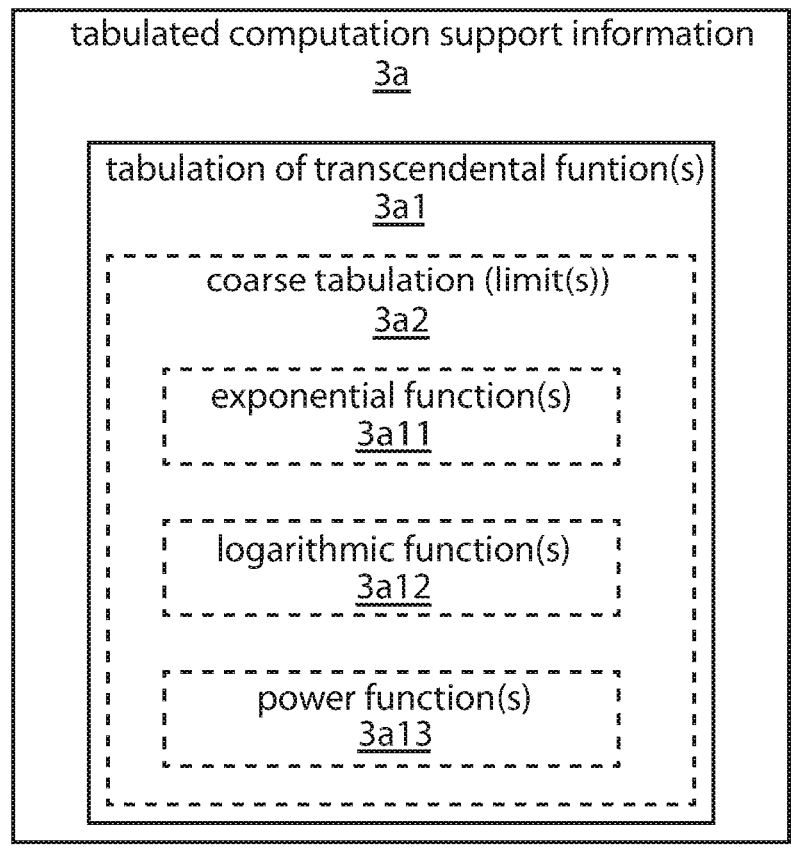
FIG. 5 is a schematic diagram illustrating, according to an implementation example, tabulation of computation support information 3.

In the following, embodiments will sometimes be exemplified in connection with particular cellular technologies, such as, for example, the WCDMA cellular technology. This, however, is not done for the purpose of limitation, but only to facilitate understanding by illustrating embodiments in a concrete context. Consequently, the teachings presented herein may be applied also in other cellular technologies, in particular in any CDMA (Code Division Multiple Access) based cellular technology. Sometimes, well known technical details may have been left out in order not to confuse the reader with details which are not necessary for the understanding the presented inventive teachings.

FIG. 1 is a block diagram illustrating a radio network node 1, in accordance with an exemplary embodiment, for use in a cellular communication network. In some exemplary embodiments, the radio network node 1 may for example be an RBS such as for example a NodedB of a WCDMA cellular communication network. The radio network node 1 provides radio access in one or more cells. These cells will be referred to as own cells herein. One such own cell 4a is shown in the figure. One or more user equipments (UEs) 5a are currently located in the own cell 4a. The one or more UEs 5a transmit radio signals to a radio unit 7 of the radio network node 1 via a radio uplink UL. In some exemplary embodiments, the uplink UL may be a so-called enhanced uplink (EUL) of a WCDMA cellular communication network. The cellular network includes also one or more neighbor cells 4b which are associated with other radio network nodes. UE(s) 5b in the neighbor cells 4b transmit radio signals to the radio network nodes associated with the neighbor cells. However, these signals may also to some extent be received (overheard) by the radio unit 7 of the radio network node 1 were they will appear as so-called neighbor cell interference 6. The radio network node 1 comprises processing circuitry 2 with at least one of its tasks being to perform an estimation of the neighbor cell interference 6. The term processing circuitry should not be construed as relating only to digital processing but may include other types of processing as well, such as, for example, processing relating to various forms of measurements, as will be explained in more detail in the following. Optionally, the processing circuitry 2 may be located in a base band unit (not shown) of the radio network node 1. Optionally, the radio network node 1 may also comprise tabulated computation support information 3, which may be used by for facilitating computational operations performed by, for example, the processing circuitry 2. The tabulated computation support information 3 may, for example, be stored in a memory in the radio network node 1. The nature and use of the tabulated computation support information 3 will be elaborated on subsequently.

The term UE used above will be used in this description for denoting a wireless communication device or any device which is capable of wireless communications. The term user equipment or UE may thus include any device, which may be used by a user for wireless communications. Accordingly, the term user equipment or UE may alternatively be referred to as a mobile terminal, a terminal, a user terminal (UT), a wireless terminal, a wireless communication device, a wireless transmit/receive unit (WTRU), a mobile phone, a cell phone, a table computer, a smart phone, etc. Moreover, the term user equipment or UE includes MTC (Machine Type Communication) devices, which do not necessarily involve human interaction. MTC devices are sometimes also referred to as Machine-to-Machine (M2M) devices.

FIG. 2 is a flowchart illustrating a method, according to an exemplary embodiment, of neighbor cell interference estimation, which may, for example, be carried out by the processing circuitry 2 of the radio network node 1.

The method starts with an action A1 (optional) of obtaining tabulated computation support information 3. This may entail retrieving such information from a data storage unit (memory) or a database. Alternatively, it may also entail actual generation, and subsequent storing, of the tabulated computation support information 3.

The method continues with an action A2 of measuring an (uplink) received total wideband power (RTWP) experienced at the radio network node 1. Loosely speaking, the RTWP is a total power received by the radio network node 1 over a wideband channel and it includes typically signal power relating to transmissions from the UEs 5a of the own cell 4a, the neighbor cell interference 6 and thermal noise. A more detailed discussion of RTWP and its measurement will be given later in connection with implementation examples.

The method continues with an action A3 of measuring a load utilization experienced at the radio network node 1.

Load utilization is a quotient of a load that is actually used by UEs 5a in the own cell 4a, and a maximum granted load as determined by, for example, scheduling. Load utilization is hence a number between 0 and 1, that expresses how much of the maximum granted load that is used by the UEs 5a of the own cell 4a. This number can be thought of as a probability value and will be referred to as load utilization probability $p_{load}(t)$ in the following. It can be noted that, in WCDMA, UEs do not have to use their maximum granted load, while in the 4G LTE (Long Term Evolution) cellular system they must. Hence the load utilization is always 1 (one) in the LTE cellular system, while it varies with the UL traffic needs in WCDMA.

The method continues with an action A4 of performing vector estimation of neighbor cell interference. The vector estimation in action A4 is performed based on the measured RTWP and the measured load utilization as input. In vector estimation, a behaviour of a dynamic system is modelled by vector(s) in a state space and with operations performed on such vectors. A vector is here a member of $R^n$—i.e. the $n^{th}$ Cartesian product of the real field R. Here n is assumed to be an integer which is equal or greater than two. Members of $R^1=R$ are instead referred to as scalars herein. $R^n$ is of course augmented with a vector space structure by introduction of addition of vectors and multiplication by scalars in the normal way. In the following, the space $R^n$ will be frequently identified with the isomorphic space $R^{n \times 1}$ (space of n dimensional column vectors over R), which allows a convenient use of matrix algebra to express various forms of operations on vectors, as is well understood by the persons skilled in the art. As mentioned above, some techniques for vector estimation of neighbor cell interference are known per se. However, in the action A4, it suggested that the vector estimation is performed via decomposition into scalar component estimations. This means that vector, or matrix, expressions that form part of the vector estimation algorithm are subjected to component projections which result in a number of scalar expressions. At first, it may appear that nothing would be gained by such a procedure. However, in the so obtained scalar component estimations it is possible to remove from the outset certain superfluous arithmetic operations—something which would have been impossible to do if the vector estimation was based e.g. on application of standard vector and matrix routine packages. The superfluous arithmetic operations can for example be multiplications where at least one factor is zero or an addition where a term is zero; subtraction is here viewed as a special case of addition. Herein, when referring to scalar component estimations, it will be assumed that these have been computationally optimized, that is, the above-mentioned superfluous operations have been removed. In implementation examples to be described later it will be shown that a considerable computational gain can be achieved by this procedure. In exemplary embodiments, the method may use a 4-state/2-measurement extended Kalman filtering in performing the vector estimation.

A main advantage of vector estimation based on the two measured quantities RTWP and load utilization is that a load utilization estimate allows the fraction of the RTWP that corresponds to an own cell power to be estimated as well, in parallel. When an own cell contribution is known, remaining parts of the RTWP must be made up of a sum of neighbour cell interference and thermal noise power. An estimated thermal noise power can be subtracted to obtain the sought estimate of the neighbour cell interference power. A detailed example of this procedure will be given later.

The method continues with an action A5 (optional) of using the tabulated computation support information 3 for facilitating processing in the radio network node 1. The action A5 is, however, not to be interpreted such that it follows after the action A4. Instead, the tabulated computation support information may be used in the action A4 and/or in other forms of processing performed by the radio network node 1.

A result of the vector estimation of neighbour cell interference may optionally be used subsequently for a number of functions, for example, including:
i) Coordinated scheduling, where a scheduler makes use of the estimated neighbour cell interference power to determine what amount of own cell load that may be granted to fill a (power) headroom.
ii) Dynamic thresholding, where a total grant headroom is adjusted depending on the estimated neighbour cell interference. The idea is that neighbour cell interference is less likely to cause instability of the own cell 4a. Therefore, a threshold for a load granted to UEs 5a in the own cell 4a may be higher in case the estimated neighbour cell interference 6 is high.

As mentioned, in exemplary embodiments, the processing circuitry 2 may be configured to perform the method illustrated in FIG. 2. The processing circuitry 2 may, for example, be implemented using circuitry with individual hardware components, application specific integrated circuitry, programmable circuitry or any combination thereof. The processing circuitry 2 may also fully or partially be implemented using one or more digital processors and computer readable memory with program code which may be executed by the one or more digital processors to perform one or more functions performed by the processing circuitry 2.

Consequently, in exemplary embodiments, the processing circuitry 2 is configured to measure a received total wideband power, RTWP, experienced at the radio network node 1. The processing circuitry 2 is further configured to measure a load utilization experienced at the radio network node 1. The processing circuitry 2 is also configured to perform a vector estimation of neighbour cell interference experienced at the radio network node 1 based on the measured RTWP and the measured load utilization such that the vector estimation is performed via a decomposition into at least two scalar component estimations.

FIG. 3 is a block diagram illustrating a non-limiting implementation example of the processing circuitry 2. The exemplary processing circuitry in FIG. 3 is referenced as 2a, to indicate that this is only a specific non-limiting example. The processing circuitry 2a comprises measurement circuitry 2a1, which is configured to perform measurement of RTWP and load utilization. The processing circuitry further comprises circuitry 2a2 configured to perform vector estimation of neighbor cell interference based on the measured RTWP and load utilization provided by the circuitry 2a1. The circuitry 2a2 comprises in particular circuitry 2a3 configured to implement a number (at least two) of scalar component estimators which perform the scalar component estimation discussed earlier. In exemplary embodiments, the circuitry 2a1 may form one unit and the circuitry 2a2 may form another unit.

FIG. 4 is a block diagram illustrating another non-limiting implementation example of the processing circuitry 2. The exemplary processing circuitry in FIG. 4 is referenced as 2b, to indicate that this is only a specific non-limiting example. The processing circuitry 2b comprises measurement circuitry 2b1, which is configured to perform measurement of RTWP and load utilization. The processing circuitry $2b$ further comprises one or more digital processors $2b4$, which may comprise, for example, microprocessor(s), digital signal processor(s), micro controller(s), or combinations thereof. The processing circuitry $2b$ further comprises a computer readable memory $2b5$ with program code which may be executed by the one or more digital processors $2b4$. The computer readable memory $2b5$ comprises program code $2b2$ with program instructions which when executed by the digital processor(s) $2b4$ will cause the digital processor(s) to execute vector estimation of neighbor cell interference based on the measured RTWP and load utilization provided by the circuitry $2b1$. In particular, the program instructions $2b2$ comprise program instructions $2b3$ implementing (at least two) scalar component estimations.

FIG. 5 is a schematic diagram illustrating non-limiting implementation example of the tabulation of computation support information 3. The exemplary tabulation of computation support information in FIG. 5 is referenced as $3a$, to indicate that this is only a specific non-limiting example. The tabulation of computation support information $3a$ comprises here tabulation $3a1$ of one or more transcendental functions. The tabulation $3a1$ may include a tabulation $3a11$ of one or more exponential functions, a tabulation $3a12$ of one or more logarithmic functions, a tabulation $3a13$ of one or more power functions, combinations thereof or functions based thereon. In exemplary embodiments, the tabulation $3a1$ of at least one transcendental function may include tabulation of at least one of: $10 \log(x)$, $10^{x/10}$ and $\sqrt{x}$, where $\log(x)$ denotes the logarithm of the base ten.

In exemplary embodiments, the tabulation $3a1$ of the at least one transcendental function comprises that the tabulation is a "coarse" tabulation $3a2$ in the sense that a number of tabulation entries for each function are restricted below a determined limit. This limit may be different for different transcendental functions. In particular embodiments, the limit may be 256 entries or less. A benefit of using the coarse tabulation $3a2$ can be significant in case tabulation lookup requires a search in the tabulation.

In exemplary embodiments the tabulation $3a1$ of at least one transcendental function may be generated based on a minimum accuracy limit, which may, for example, be quantified in terms of dBs of an absolute error between the tabulation values and an exact function evaluation. This way, it is possible to make the tabulation $3a1$ as small as possible, while still maintaining the performance of the application at hand—here the accuracy of the neighbour cell interference.

A transcendental function is by definition a function that is not an algebraic function. Loosely speaking, this means that a transcendental function cannot be evaluated by a finite number of basic algebraic operations. Strictly speaking, not every power function is a transcendental function. However, for convenience, no such distinction will be made here, and power functions will in general be viewed as being transcendental functions—in particular when function evaluation is non-trivial, such as e.g. in the case of the square root function $\sqrt{x}$.

Consequently, in exemplary embodiments, the processing circuitry may be configured to obtain tabulated computation support information 3. The processing 2 may further be configured to use the tabulated computation support information 3 during performance of the vector estimation of neighbor cell interference. In exemplary embodiments the tabulated computation support information 3 may comprise a tabulation $3a1$ of at least one transcendental function. In exemplary embodiments, the tabulation $3a1$ of at least one transcendental function may comprise tabulation of at least: one or more logarithmic functions $3a12$, one or more power functions $3a13$ or one or more exponential functions $3a11$, or one or more functions based thereon. In exemplary embodiments, a number of tabulation entries for the at least one transcendental function $3a1$ may be restricted below a limit $3a2$. In exemplary embodiments the limit ($3a2$) may be 256 entries or less.

In this context it can be noted that certain processing circuitry, such as digital processors et cetera, often is tailored for computations involving only elementary arithmetic operations, like additions, subtractions, multiplications and divisions. This means that such circuitry is equipped with hardware (typically on silicon) that efficiently performs such operations. However, in case a more complex operations, such as evaluation of transcendental functions, the computation may have to be performed with an additional (software) algorithm that makes repeated use of the elementary arithmetic computations. Often, many elementary operations may be required for the computation, and this leads to a long computation time. This is a significant drawback when real time computations are to be performed as in the present application. A remedy for the situation is therefore to use the tabulated computation support information 3 such that e.g. a processor can look up, or more easily compute, a value of a transcendental function, or other tabulated quantity. This reduces the computation time, at the expense of use of more memory.

In coarse tabulation, preferably only a relevant range, for the intended application, may be tabulated for each transcendental function.

In exemplary embodiments, an extra low computational complexity can be achieved by application of a binary search in the tabulation, when computing the value of a transcendental function. Moreover, accuracy may be achieved by application of interpolation (typically linear) between adjacent table entries, for values not explicitly appearing in the tabulation. A binary search algorithm starts by comparing a mid table entry to the independent variable value. In case the mid table entry is larger than the independent variable value, the search is constrained to the lower part of the table and a new mid table entry is selected for that half and the procedure is repeated. In case the mid table entry is smaller than the independent variable value, the search is constrained to the upper part of the table and a new mid table entry is selected for that half and the procedure is repeated. This continues until there is only two adjacent entries remaining. Finally linear interpolation is performed between the entries In exemplary embodiments, the tabulation may be logarithmically distributed table entries, giving a fixed table resolution per dB, rather than in the linear domain. It is noted that a range needed for a coarse tabulation may exceed a factor of $10^{20}$—yet in exemplary embodiments only 256 entries may be needed, if the tabulation is carefully selected in view of the application. This may be done, for example, by a trial and error methodology. For example, a performance of the vector estimation of neighbor cell interference may be tested for various table sizes, so that a performance is not reduced more than a pre-specified number of dBs (typically a few tenths of a dB). When using a logarithmically distributed table, a search algorithm may be used to find the table entries in between which an independent variable is located.

Figure 6:
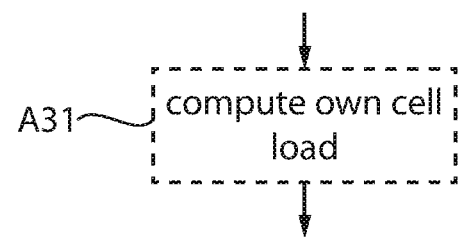
FIG. 6 is a partial flowchart illustrating an action which optionally may form part of the method of FIG. 2.

FIG. 6 illustrates an optional action A31 which may be part of the method in FIG. 2. In the action A31, an own cell load associated with the own cell $4a$ is computed, e.g. by the processing circuitry 2. The action A31 is performed prior to the action A4, and the action A4 may use the computed own cell load as input to the vector estimation; examples are provided later. Load in e.g a WCDMA uplink is expressed in terms of the interference power as compared to an unloaded situation. In the unloaded situation only thermal noise power affects the uplink. Hence the quotient between the total power in the uplink and the thermal noise power floor is a relevant quantity, cf. equation (1) below. As will be described later (see e.g. equation (10)), the RoT of equation (1) can be expressed in terms of load factors instead. These load factors describe the load as a fraction of a maximum load. The own cell load is conveniently expressed in terms of such a load factor, where the contributions then only come from UEs of the own cell.

Some more detailed implementation examples will now be presented. The details of these examples are not for the purpose of limitation but rather for the purpose of facilitating understanding and appreciation of the benefits provided by exemplary embodiments. Consequently, by way of example, the implementation examples will be given in the context of a WCDMA cellular system, the uplink UL will be assumed to be in accordance with EUL protocols and a diversity antenna system may be used on occasion.

First will be described measurement and estimation techniques to measure an instantaneous total load on the uplink air interface of the radio network node 1.

It can be shown that the load, at an antenna connector, is given by a noise rise, or rise over thermal, RoT(t), defined by $$RoT(t) = \frac{P_{RTWP}(t)}{P_N(t)}, \quad (1)$$

where $P_N(t)$ is a thermal noise level as measured at an antenna connector. It remains to define $P_{RTWP}(t)$—that is the RTWP at time t—more rigorously. This relative measure is unaffected of any de-spreading applied. The definition used here is simply the total wideband power according to $$P_{RTWP}(t) = \sum_{i=1}^{I} P_k(t) + P_{neighbor}(t) + P_N(t), \quad (2)$$

also measured at the antenna connector. Here $P_{neighbor}(t)$ denotes the power as received from neighbor cells 4b, i.e. the power of neighbor cell interference 6, while $P_i(t)$ denotes a power of UE i in the own cell 4a. As will be seen below, a major difficulty of any RoT estimation algorithm is to separate the thermal noise power from the inter-cell interference 6 from neighbor cells 4b.

Signal reference points are by definition at the antenna connectors. Measurements are however obtained after an analogue signal conditioning chain, in a digital receiver (not shown in FIG. 1). The analogue signal conditioning chain does introduce a scale factor error of about 1 dB (1-sigma) that is difficult to compensate for. Fortunately, all powers of (2) are equally affected by the scale factor error so when (1) is calculated, the scale factor error is cancelled as $$RoT^{DigitalReceiver}(t) = \frac{P_{RTWP}^{DigitalReceiver}(t)}{P_N^{DigitalReceiver}(t)} = \frac{\gamma(t) P_{RTWP}^{Antenna}(t)}{\gamma(t) P_N^{Antenna}(t)} = RoT^{Antenna}(t). \quad (3)$$

In order to understand a basic difficulty of neighbor cell interference, when performing load estimation, note that $$P_{neighbor}(t) + P_N(t) = E[P_{neighbor}(t)] + E[P_N(t)] + \Delta P_{neighbor}(t) + \Delta P_N(t), \quad (4)$$

where E[ ] denotes mathematical expectation and where Δ denotes a variation around a mean. If there are no measurements available in the radio network node 1 that are related to the inter-cell interference 6, a linear filtering operation can at best estimate the sum $E[P_{neighbor}(t)] + E[P_N(t)]$. This estimate cannot be used to deduce a value of $E[P_N(t)]$. The situation is the same as when the sum of two numbers is available. Then there is no way to figure out the values of the individual numbers. It can be proved that the noise power floor is not mathematically observable.

One state of the art RoT estimation algorithm (sliding window) can be found e.g. in the above-mentioned article T. Wigren and P. Hellqvist, "Estimation of uplink WCDMA load in a single RBS", Proc. IEEE VTC-2007 Fall, Baltimore, Md., USA, Oct. 1-3, 2007. The algorithm estimates the RoT, as given by (1). A main task of this RoT estimation algorithm is an accurate estimation of a thermal noise floor N(t). Since it is not possible to obtain exact estimates of this quantity due to the inter-cell interference 6, an estimator therefore applies an approximation, by consideration of a soft minimum as computed over a relatively long window in time. It is important to understand that this estimation relies on the fact that the noise floor is constant over very long periods of time (disregarding the small temperature drift).

The above-mentioned sliding window algorithm has the disadvantage of requiring a large amount of storage memory. This becomes particularly troublesome in case a large number of instances of the algorithm are needed. To reduce memory consumption, a recursive algorithm has been proposed in the article T. Wigren, "Recursive noise floor estimation in WCDMA", IEEE Trans. Veh. Tech., vol. 59, no. 5, pp. 2615-2620, 2010. This algorithm reduces the memory requirements compared to the sliding window scheme discussed above at least by a factor of 100-1000.

Both to the sliding window RoT estimation algorithm and the recursive algorithm are applicable to the implementation examples disclosed hereinafter.

Now techniques needed to predict an instantaneous load on the uplink UL air interface ahead in time will be briefly described. This functionality is needed by a scheduler (not shown in FIG. 1) of the EUL. A reason is that the scheduler tests different combinations of grants to determine the best combinations, e.g. maximizing the throughput. This scheduling decision will only affect an air interface load, i.e. the load measured directly at the antenna connector, after a number of transmission time intervals (TTIs), each such TTI being 2 or 10 ms, due to grant transmission latency and UE latency before the new grant takes effect over the air interface. Time division duplex (TD) scheduling is further discussed below. Briefly, the time division duplex divides users to separate time intervals for their uplink high speed transmissions.

A SIR based prediction of uplink load, for a tentative scheduled set of UEs and grants, is based on the power relation $$P_{RTWP}(t) - P_N(t) = \sum_{i=1}^{N} L_i(t) P_{RTWP}(t) + P_{neighbor}(t), \quad (5)$$

where $L_i(t)$ is a load factor of the i:th UE of the own cell 4a and where $P_{neighbor}(t)$ denote the (power of) neighbor cell interference 6, which is also denoted inter-cell interference. The load factors of the own cell 4a are computed as follows. First it is noted that $$(C/I)_i(t) = \frac{P_i(t)}{P_{RTWP}(t) - (1-\alpha)P_i} = \frac{L_i(t)P_{RTWP}(t)}{P_{RTWP}(t) - (1-\alpha)L_i(t)P_{RTWP}(t)} = \frac{L_i(t)}{1-(1-\alpha)L_i(t)} \quad (6)$$

$$\Leftrightarrow$$

$$L_i(t) = \frac{(C/I)_i(t)}{1+(1-\alpha)(C/I)_i(t)},$$

$$i = 1, \ldots, I,$$

where I is a number of UEs 5a in the own cell 4a and $\alpha$ is a self-interference factor. The $(C/I)_i(t)$, i=1, ..., I, are then related to a signal to noise ratio (SINR), which may be measured on a DPCCH channel, as follows $$(C/I)_i(t) = \frac{SINR_i(t)}{W_i} \frac{RxLoss}{G} \times \left(1 + \frac{\beta_{DPDCH,i}^2(t) + \beta_{EDPCCH,i}^2(t) + n_{codes,i}(t)\beta_{EDPDCH,i}^2(t) + \beta_{HSDPCCH,i}^2(t)}{\beta_{DPCCH}^2(t)}\right), \quad (7)$$

$$i = 1, \ldots, I.$$

Here $W_i$ is a so called spreading factor. The spreading factor measures an improvement of the signal to noise ratio when the codes of the WCDMA transmission that overlay the message, are removed by correlation processing. RxLoss represents missed receiver energy that is due to the fact that some signal energy is always missed by the WCDMA receiver. G is a diversity gain, i.e. the gain from using multiple antennas, and the β:s are beta factors that define the power overhead of the respective data channels with respect to the control channel of a user, assuming not active channels to have zero beta factors.

The UL load prediction then involves computation of the uplink load of the own cell 4a by a calculation of (6) and (7) for each UE 5a of the own cell 4a, followed by a summation $$L_{own}(t) = \sum_{i=1}^{I} L_i(t), \quad (8)$$

which transforms (5) to $$P_{RTWP}(t) = L_{own}(t)P_{RTWP}(t) + P_{neighbor}(t) + P_N(t). \quad (9)$$

A division with $P_N(t)$ then shows that the RoT can be predicted k TTIs ahead as $$RoT(t+kT) = \frac{P_{neighbor}(t)/P_N(t)}{1-L_{own}(t)} + \frac{1}{1-L_{own}(t)}. \quad (10)$$

The above-described SIR based load factor calculation can be replaced by a power based one, where the basic definition of the load factor $$L_i(t) = \frac{P_i(t)}{P_{RTWP}(t)}, \quad (11)$$

is used, instead of (6). An advantage is that a parameter dependence is reduced. On the downside, a measurement of the UE power is needed.

In implementation examples below, a vector extended Kalman filter (EKF)—in combination with a separate thermal noise power estimation scheme—is used in the vector estimation of neighbor cell interference. However, other forms of vector estimators may also be used, for example, general vector Bayesian estimation algorithms or vector maximum likelihood estimation algorithms.

Here will now be proposed an example of a high performing vector estimator algorithm for neighbor cell interference estimation, or equivalently, inter-cell interference estimation. It is intended to perform a joint estimation of $P_{neighbor}(t)+P_N(t)$, $P_N(t)$, $P_{neighbor}(t)$ and the load utilization probability $P_{load}(t)$. The proposed example is provided by a vector extended Kalman filter (EKF).

The example vector estimation algorithm will use the following information
- Measurements of $P_{RTWP}(t)$, with a sampling rate of $T_{RTWP}=k_{RTWP}TTI$, $k_{RTWP}\in Z+$ (i.e. a positive integer). Available for each antenna branch.
- Computed load factors $L_{own}(t)$, with a sampling rate of $T_L=k_L TTI$, $k_L\in Z+$. Available per cell. Valid on cell level, not necessarily valid on antenna branch level with Rx diversity.
- The loop delay $T_D$ between the calculation of $L_{own}(t)$, and the time it takes effect on the air interface. The loop delay is dependent on the TTI. Available for and valid per cell.
- Measured load factors $\overline{L}_{own}(t)$, with a sampling rate of T $\tau=k_{\overline{L}}TTI$, $k_{\overline{L}}\in Z+$. Available per cell. Valid on cell level, not necessarily valid on antenna branch level with Rx diversity. Obtained after transmission format combination index (TFCI) decoding.
- The loop delay $\overline{T}_D$ between the calculation of $\overline{L}_{own}(t)$, and the time it takes effect on the air interface. The loop delay is dependent on the TTI and larger than $T_D$ since the measured load factor calculation requires TFCI and E-TFCI decoding, where the E— stands for the E in enhanced uplink.

The states are selected as $$x_1(t)=p_{load}(t) \quad (12)$$

$$x_2(t)P_{neighbor}(t)+P_N(t) \quad (13)$$

$$x_3(t)=\Delta\overline{L}_{own}(t). \quad (14)$$

$$x_4(t)=x_1(t-T_{TTI}). \quad (15)$$

Since an additional decoding delay of (about) one TTI affects the loop, $x_1(t)$ needs to be delayed by an extra state to define the fact that the load utilization probability measurement is subject to an additional delay of one TTI. The state $x_4(t)$ is used for this purpose. $\Delta L_{own}(t)$ represents a slowly varying load factor bias error in the measurement model.

The first measured signal that is available for processing is $P_{RTWP}(t)$. The scheduled load of the own cell $L_{own}(t)$ is a computed quantity (currently based on SINR measurements), for this reason a measurement model of $P_{RTWP}(t)$ is needed, expressed in terms of the states, computed quantities and a measurement uncertainty. Towards this end it is first noted that the load of (6) does not account for the load utilization probability $p_{load}(t)$. Neither does it account for the delay $T_D$.

To model the load utilization effect, and to compensate for semi-constant load factor errors, a look at (5) suggests that load underutilization can be modeled by a modification of (5) and (6) to $$L_{own,utilized}(t) = \sum_{i=1}^{I} p_{load}(t)L_i(t - T_D) + \Delta \bar{L}_{own}(t) = p_{load}(t)L_{own}(t - T_D) + \Delta \bar{L}_{own}(t) \quad (16)$$

$$P_{RTWP}(t) = L_{own,utilized}(t)P_{RTWP}(t) + P_{neighbor}(t) + P_N(t) \quad (17)$$

which results in $$P_{RTWP}(t) = \frac{1}{1 - L_{own}(t - T_D)p_{load}(t) + \Delta \bar{L}_{own}(t)}(P_{neighbor}(t) + P_N(t)). \quad (18)$$

After addition of a zero mean white measurement noise $e_{RTWP}(t)$ and replacement of variables by the states of (12)-(15), the following nonlinear measurement equation results $$y_{RTWP}(t) = \frac{x_2(t)}{1 - L_{own}(t - T_D)x_1(t) + x_3(t)} + e_{RTWP}(t) \quad (19)$$

$$R_{2,RTWP}(t) = E[e_{RTWP}^2(t)]. \quad (20)$$

Here $y_{RTWP}(t) = P_{RTWP}(t)$ and $R_{2,RTWP}(t)$ denotes a covariance matrix of $e_{RTWP}(t)$.

Note that (19) represents a nonlinear load curve, expressed in terms of the estimated sum of neighbor cell interference and noise floor power ($x_1(t)$), the estimated load utilization probability ($x_2(t)$), and the estimated load factor bias ($x_3(t)$). Further the computed ("received") load factor is used in the nonlinear load curve. Equation (19) relates the momentary combined effect of the estimated quantities and received quantities to the left hand side of the equation, i.e. the momentary measurement of the wideband power.

The measurement can be made available per cell. In a first step the decoded TFCIs and E-TFCISs show which grants the UE actually used in the last TTI. This provides the information needed to compute the actual load factor of the last TTI, i.e. to compute $$p_{load}(t) = \frac{\bar{L}_{own}(t - T_D)}{L_{own}(t - T_D)}. \quad (21)$$

With this modification the measurement model for the load utilization probability measurement becomes $$y_{loadUtilization}(t) = x_4(t) + e_{loadUtilization}(t) \quad (22)$$

$$R_{2,loadUtilization}(t) = E[e_{loadUtilization}(t)]^2. \quad (23)$$

The transformation (21) essentially replaces the granted load factor, $L_{own}(t-T_D)$, with the load factor computed based on received TFCIs and E-TFCIs.

Random walk models are adapted for the state variables $x_1(t)$ and $x_2(t)$. In order to avoid a drifting bias correction of the load factor, an autoregressive model is used for the state $x_3(t)$. A further motivation for this is that the state is expected to model errors that, over an ensemble, has a zero mean. Hence the following state vector model results from the states of (12)-(15)

$$x(t + T_{TTI}) \equiv \begin{pmatrix} x_1(t + T_{TTI}) \\ x_2(t + T_{TTI}) \\ x_3(t + T_{TTI}) \\ x_4(t + T_{TTI}) \end{pmatrix} \quad (24)$$

$$= \begin{pmatrix} 1 & 0 & 0 & 0 \\ 0 & 1 & 0 & 0 \\ 0 & 0 & a & 0 \\ 1 & 0 & 0 & 0 \end{pmatrix} \begin{pmatrix} x_1(t) \\ x_2(t) \\ x_3(t) \\ x_4(t) \end{pmatrix} + \begin{pmatrix} w_1(t) \\ w_2(t) \\ w_3(t) \\ w_4(t) \end{pmatrix}$$

$$R_1(t) = E\left[\begin{pmatrix} w_1(t) \\ w_2(t) \\ w_3(t) \\ w_4(t) \end{pmatrix} (w_1(t) \ w_2(t) \ w_3(t) \ w_4(t)) \right]. \quad (25)$$

By setting a=1 a random walk model is obtained for all states. Again, a diagonal covariance matrix is commonly used. The last component of the system noise is preferably selected to be very small, reflecting the pure delay it is intended to model.

The state space vector model behind the vector extended Kalman filter (EKF) is $$x(t+T) = A(t)x(t) + B(t)u(t) + w(t) \quad (26)$$

$$y(t) = c(x(t)) + e(t) \quad (27)$$

Here $x(t)$ is the state vector, $u(t)$ is an input vector that will not be used here, $y(t)$ is an output measurement vector consisting of the power measurements performed in the cell i.e. the total received wideband power, RTWP, $w(t)$ is the so called systems noise vector that represent the model error, and $e(t)$ denotes a measurement error vector. The matrix $A(t)$ is the system matrix describing the dynamic modes, the matrix $B(t)$ is the input gain matrix, while the vector $c(x(t))$ is the, possibly nonlinear, measurement vector function which is a function of the states of the system. Finally t represents the time and T represents the sampling period.

The general case with a nonlinear measurement vector is, by way of example, considered here. For this reason the vector extended Kalman filter needs to be applied. This filter is given by the following matrix and vector iterations,

---

Initialization
$t = t_0$
$\hat{x}(0 \mid -1) = x_0$
$P(0 \mid -1) = P_0$
Iteration
$t = t + T$ $$C(t) = \left.\frac{\partial c(x)}{\partial x}\right|_{x=\hat{x}(t|t-T)}$$

$K_f(t) = P(t \mid t - T)C^T(t)(C(t)P(t \mid t - T)C^T(t) + R_2(t))^{-1}$
$\hat{x}(t \mid t) = \hat{x}(t \mid t - T) + K_f(t)(y(t) - c(\hat{x}(t \mid t - T)))$
$P(t \mid t) = P(t \mid t - T) - K_f(t)C(t)P(t \mid t - T)$
$\hat{x}(t + T \mid t) = A\hat{x}(t \mid t) + Bu(t)$
$P(t + T \mid t) = AP(t \mid t)A^T + R_1.$
End                                                                (28)

---

The quantities introduced by the filter iterations (28) are as follows. $\hat{x}(t|t-T)$ is a state vector prediction, based on data up to time t−T, $\hat{x}(t|t)$ is a filter update vector, based on data up to time t, $P(t|t-T)$ is a covariance matrix of the state prediction, based on data up to time t−T, and $P(t|t)$ is a covariance matrix of the filter update, based on data up to time t. $C(t)$ is a linearized measurement matrix (linearization around the most current state prediction), $K_f(t)$ is a time variable Kalman gain matrix, $R_2(t)$ is a measurement covariance matrix, and $R_1(t)$ is a system noise covariance matrix. It can be noted that $R_1(t)$ and $R_2(t)$ are often used as tuning variables of the filter. In principle the bandwidth of the filter is controlled by a matrix quotient of $R_1(t)$ and $R_2(t)$.

The vector extended Kalman filter is per se known it is the way it is applied according to the vector measurement models and dynamic state vector models that taken together create an example embodiment.

The quantities of the vector EKF for estimation of neighbor cell interference, load utilization load factor bias can now be defined. Using (19)-(20) and (22)-(25) it follows that $$C(t) = \begin{pmatrix} C_{11}(t) & C_{12}(t) & C_{13}(t) & 0 \\ 0 & 0 & 0 & C_{24}(t) \end{pmatrix} \quad (29)$$

$$C_{11}(t) = \frac{L_{own}(t-T_D)\hat{x}_2(t|t-T_{TTI})}{(1-L_{own}(t-T_D)\hat{x}_1(t|t-T_{TTI})+\hat{x}_3(t|t-T_{TTI}))^2} \quad (30)$$

$$C_{12}(t) = \frac{1}{1-L_{own}(t-T_D)\hat{x}_1(t|t-T_{TTI})+\hat{x}_3(t|t.-T_{TTI})} \quad (31)$$

$$C_{13}(t) = -\frac{\hat{x}_2(t|t-T_{TTI})}{(1-L_{own}(t-T_D)\hat{x}_1(t|t-T_{TTI})+\hat{x}_3(t|t-T_{TTI}))^2} \quad (32)$$

$$C_{24}(t) = 1 \quad (33)$$

$$R_2(t) = E\left[\begin{pmatrix} e_{RTWP}(t) \\ e_{loadUtilization}(t) \end{pmatrix}(e_{RTWP}(t) \quad e_{loadUtilization}(t))\right] \quad (34)$$
$$= \begin{pmatrix} R_{2,11}(t) & R_{2,12}(t) \\ R_{2,12}(t) & R_{2,22}(t) \end{pmatrix}$$

$$c(\hat{x}(t|t-T_{TTI})) = \begin{pmatrix} \dfrac{\hat{x}_2(t|t-T_{TTI})}{1-L_{own}(t-T_D)\hat{x}_1(t|t-T_{TTI})+\hat{x}_3(t|t-T_{TTI})} \\ \hat{x}_4(t|t-T_{TTI}) \end{pmatrix} \quad (35)$$

$$A = \begin{pmatrix} 1 & 0 & 0 & 0 \\ 0 & 1 & 0 & 0 \\ 0 & 0 & a & 0 \\ 1 & 0 & 0 & 0 \end{pmatrix} \quad (36)$$

$$B = 0 \quad (37)$$

$$R_1(t) = E\left[\begin{pmatrix} w_1(t) \\ w_2(t) \\ w_3(t) \\ w_4(t) \end{pmatrix}(w_1(t) \quad w_2(t) \quad w_3(t) \quad w_4(t))\right] \quad (38)$$
$$= \begin{bmatrix} R_{1,11}(t) & R_{1,12}(t) & R_{1,13}(t) & R_{1,14}(t) \\ R_{1,12}(t) & R_{1,22}(t) & R_{1,23}(t) & R_{1,24}(t) \\ R_{1,13}(t) & R_{1,23}(t) & R_{1,33}(t) & R_{1,34}(t) \\ R_{1,14}(t) & R_{1,24}(t) & R_{1,34}(t) & R_{1,44}(t) \end{bmatrix}$$

In order to execute the vector EKF, the state vector prediction and the state covariance prediction at time t given by the following equations are needed, $$\hat{x}(t|t-T_{TTI}) = \begin{pmatrix} \hat{x}_1(t|t-T_{TTI}) \\ \hat{x}_2(t|t-T_{TTI}) \\ \hat{x}_3(t|t-T_{TTI}) \\ \hat{x}_4(t|t-T_{TTI}) \end{pmatrix} \quad (39)$$

$$P(t|t-T_{TTI}) = \quad (40)$$
$$\begin{pmatrix} P_{11}(t|t-T_{TTI}) & P_{12}(t|t-T_{TTI}) & P_{13}(t|t-T_{TTI}) & P_{14}(t|t-T_{TTI}) \\ P_{12}(t|t-T_{TTI}) & P_{22}(t|t-T_{TTI}) & P_{23}(t|t-T_{TTI}) & P_{24}(t|t-T_{TTI}) \\ P_{13}(t|t-T_{TTI}) & P_{23}(t|t-T_{TTI}) & P_{33}(t|t-T_{TTI}) & P_{34}(t|t-T_{TTI}) \\ P_{14}(t|t-T_{TTI}) & P_{24}(t|t-T_{TTI}) & P_{34}(t|t-T_{TTI}) & P_{44}(t|t-T_{TTI}) \end{pmatrix}.$$

The equations (29)-(40) define the vector EKF completely, when inserted in (28). The final step is to compute the neighbor cell interference estimate as $$\hat{P}_{neighbor}(t|t) = \hat{x}_2(t|t) - \hat{P}_N(t|t), \quad (41)$$

where $\hat{P}_N(t|t)$ is the estimated thermal noise power floor, obtained as described above.

Here will now be illustrated how the vector estimation can be decomposed into scalar component estimations with superfluous operations removed for heightened computational efficiency. With the matrix definitions (29)-(38) and after quite some algebra (in particular the Kalman gain matrix computation needs to be divided into steps) the vector extended Kalman filter iteration can be decomposed into the following sets of recursive scalar component estimations.

---

Iteration over t
t = t + T $$c_1(\hat{x}(t|t-T_{TTI})) = \frac{\hat{x}_2(t|t-T_{TTI})}{1-L_{own}(t-T_D)\hat{x}_1(t|t-T_{TTI})+\hat{x}_3(t|t-T_{TTI})}$$

$$c_2(\hat{x}(t|t-T_{TTI})) = \hat{x}_4(t|t-T_{TTI})$$

$$C_{11}(t) = \frac{L_{own}(t-T_D)\hat{x}_2(t|t-T_{TTI})}{(1-L_{own}(t-T_D)\hat{x}_1(t|t-T_{TTI})+\hat{x}_3(t|t-T_{TTI}))^2}$$

$$C_{12}(t) = \frac{1}{1-L_{own}(t-T_D)\hat{x}_1(t|t-T_{TTI})+\hat{x}_3(t|t.-T_{TTI})}$$

$$C_{13}(t) = \frac{\hat{x}_2(t|t-T_{TTI})}{(1-L_{own}(t-T_D)\hat{x}_1(t|t-T_{TTI})+\hat{x}_3(t|t-T_{TTI}))^2}$$

$$C_{24}(t) = 1$$

-continued $(CPC^T + R_2)_{11}(t) = C_{11}^2(t)P_{11}(t \mid t - T_{TTI}) + 2C_{11}(t)C_{12}(t)P_{12}(t \mid t - T_{TTI}) + 2C_{11}(t)C_{13}(t)P_{13}(t \mid t - T_{TTI}) + C_{12}^2(t)P_{22}(t \mid t - T_{TTI}) + 2C_{12}(t)C_{13}(t)P_{23}(t \mid t - T_{TTI}) + C_{13}^2(t)P_{33}(t \mid t - T_{TTI})$ $(CPC^T + R_2)_{12}(t) = C_{11}(t)C_{24}(t)P_{14}(t \mid t - T_{TTI}) + C_{12}(t)C_{24}(t)P_{24}(t \mid t - T_{TTI}) + C_{13}(t)C_{24}(t)P_{34}(t \mid t - T_{TTI})$ $(CPC^T + R_2)_{22}(t) = C_{24}^2(t)P_{44}(t \mid t - T_{TTI})$ $$(CPC^T + R_2)_{11}^{-1}(t) = \frac{(CPC^T + R_2)_{22}(t)}{(CPC^T + R_2)_{11}(t)(CPC^T + R_2)_{22}(t) - ((CPC^T + R_2)_{12}(t))^2}$$

$$(CPC^T + R_2)_{12}^{-1}(t) = \frac{-(CPC^T + R_2)_{12}(t)}{(CPC^T + R_2)_{11}(t)(CPC^T + R_2)_{22}(t) - ((CPC^T + R_2)_{12}(t))^2}$$

$$(CPC^T + R_2)_{22}^{-1}(t) = \frac{(CPC^T + R_2)_{11}(t)}{(CPC^T + R_2)_{11}(t)(CPC^T + R_2)_{22}(t) - ((CPC^T + R_2)_{12}(t))^2}$$

$K_{f,11}(t) = (C_{11}(t)P_{11}(t \mid t - T_{TTI}) + C_{12}(t)P_{12}(t \mid t - T_{TTI}) + C_{13}(t)P_{13}(t \mid t - T_{TTI})) \times (CPC^T + R_2)_{11}^{-1}(t) + C_{24}(t)P_{14}(t \mid t - T_{TTI})(CPC^T + R_2)_{12}^{-1}(t)$ $K_{f,12}(t) = (C_{11}(t)P_{11}(t \mid t - T_{TTI}) + C_{12}(t)P_{12}(t \mid t - T_{TTI}) + C_{13}(t)P_{13}(t \mid t - T_{TTI})) \times (CPC^T + R_2)_{12}^{-1}(t) + C_{24}(t)P_{14}(t \mid t - T_{TTI})(CPC^T + R_2)_{22}^{-1}(t)$ $K_{f,21}(t) = (C_{11}(t)P_{12}(t \mid t - T_{TTI}) + C_{12}(t)P_{22}(t \mid t - T_{TTI}) + C_{13}(t)P_{23}(t \mid t - T_{TTI})) \times (CPC^T + R_2)_{11}^{-1}(t) + C_{24}(t)P_{24}(t \mid t - T_{TTI})(CPC^T + R_2)_{12}^{-1}(t)$ $K_{f,22}(t) = (C_{11}(t)P_{12}(t \mid t - T_{TTI}) + C_{12}(t)P_{22}(t \mid t - T_{TTI}) + C_{13}(t)P_{23}(t \mid t - T_{TTI})) \times (CPC^T + R_2)_{12}^{-1}(t) + C_{24}(t)P_{24}(t \mid t - T_{TTI})(CPC^T + R_2)_{22}^{-1}(t)$ $K_{f,31}(t) = (C_{11}(t)P_{13}(t \mid t - T_{TTI}) + C_{12}(t)P_{23}(t \mid t - T_{TTI}) + C_{13}(t)P_{33}(t \mid t - T_{TTI})) \times (CPC^T + R_2)_{11}^{-1}(t) + C_{24}(t)P_{34}(t \mid t - T_{TTI})(CPC^T + R_2)_{12}^{-1}(t)$ $K_{f,32}(t) = (C_{11}(t)P_{13}(t \mid t - T_{TTI}) + C_{12}(t)P_{23}(t \mid t - T_{TTI}) + C_{13}(t)P_{33}(t \mid t - T_{TTI})) \times (CPC^T + R_2)_{12}^{-1}(t) + C_{24}(t)P_{34}(t \mid t - T_{TTI})(CPC^T + R_2)_{22}^{-1}(t)$ $K_{f,41}(t) = (C_{11}(t)P_{14}(t \mid t - T_{TTI}) + C_{12}(t)P_{24}(t \mid t - T_{TTI}) + C_{13}(t)P_{34}(t \mid t - T_{TTI})) \times (CPC^T + R_2)_{11}^{-1}(t) + C_{24}(t)P_{44}(t \mid t - T_{TTI})(CPC^T + R_2)_{12}^{-1}(t)$ $K_{f,42}(t) = (C_{11}(t)P_{14}(t \mid t - T_{TTI}) + C_{12}(t)P_{24}(t \mid t - T_{TTI}) + C_{13}(t)P_{34}(t \mid t - T_{TTI})) \times (CPC^T + R_2)_{12}^{-1}(t) + C_{24}(t)P_{44}(t \mid t - T_{TTI})(CPC^T + R_2)_{22}^{-1}(t)$ $\hat{x}_1(t \mid t) = \hat{x}_1(t \mid t - T_{TTI}) + K_{f,11}(t)(y_{RTWP}(t) - c_1(\hat{x}(t \mid t - T_{TTI}))) + K_{f,12}(y_{loadUtilization}(t) - c_2(\hat{x}(t \mid t - T_{TTI})))$ $\hat{x}_2(t \mid t) = \hat{x}_2(t \mid t - T_{TTI}) + K_{f,21}(t)(y_{RTWP}(t) - c_1(\hat{x}(t \mid t - T_{TTI}))) + K_{f,22}(y_{loadUtilization}(t) - c_2(\hat{x}(t \mid t - T_{TTI})))$ $\hat{x}_3(t \mid t) = \hat{x}_3(t \mid t - T_{TTI}) + K_{f,31}(t)(y_{RTWP}(t) - c_1(\hat{x}(t \mid t - T_{TTI}))) + K_{f,32}(y_{loadUtilization}(t) - c_2(\hat{x}(t \mid t - T_{TTI})))$ $\hat{x}_4(t \mid t) = \hat{x}_4(t \mid t - T_{TTI}) + K_{f,41}(t)(y_{RTWP}(t) - c_1(\hat{x}(t \mid t - T_{TTI}))) + K_{f,42}(y_{loadUtilization}(t) - c_2(\hat{x}(t \mid t - T_{TTI})))$ $(KCP)_{11}(t) = K_{f,11}(t)(C_{11}(t)P_{11}(t \mid t - T_{TTI}) + C_{12}(t)P_{12}(t \mid t - T_{TTI}) + C_{13}(t)P_{13}(t \mid t - T_{TTI})) + K_{f,12}(t)C_{24}(t)P_{14}(t \mid t - T_{TTI})$ $(KCP)_{12}(t) = K_{f,11}(t)(C_{11}(t)P_{12}(t \mid t - T_{TTI}) + C_{12}(t)P_{22}(t \mid t - T_{TTI}) + C_{13}(t)P_{23}(t \mid t - T_{TTI})) + K_{f,12}(t)C_{24}(t)P_{24}(t \mid t - T_{TTI})$ $(KCP)_{13}(t) = K_{f,11}(t)(C_{11}(t)P_{13}(t \mid t - T_{TTI}) + C_{12}(t)P_{23}(t \mid t - T_{TTI}) + C_{13}(t)P_{33}(t \mid t - T_{TTI})) + K_{f,12}(t)C_{24}(t)P_{34}(t \mid t - T_{TTI})$ $(KCP)_{14}(t) = K_{f,11}(t)(C_{11}(t)P_{14}(t \mid t - T_{TTI}) + C_{12}(t)P_{24}(t \mid t - T_{TTI}) + C_{13}(t)P_{34}(t \mid t - T_{TTI})) + K_{f,12}(t)C_{24}(t)P_{44}(t \mid t - T_{TTI})$ $(KCP)_{22}(t) = K_{f,21}(t)(C_{11}(t)P_{12}(t \mid t - T_{TTI}) + C_{12}(t)P_{22}(t \mid t - T_{TTI}) + C_{13}(t)P_{23}(t \mid t - T_{TTI})) + K_{f,22}(t)C_{24}(t)P_{24}(t \mid t - T_{TTI})$ $(KCP)_{23}(t) = K_{f,21}(t)(C_{11}(t)P_{13}(t \mid t - T_{TTI}) + C_{12}(t)P_{23}(t \mid t - T_{TTI}) + C_{13}(t)P_{33}(t \mid t - T_{TTI})) + K_{f,22}(t)C_{24}(t)P_{34}(t \mid t - T_{TTI})$ $(KCP)_{24}(t) = K_{f,21}(t)(C_{11}(t)P_{14}(t \mid t - T_{TTI}) + C_{12}(t)P_{24}(t \mid t - T_{TTI}) + C_{13}(t)P_{34}(t \mid t - T_{TTI})) + K_{f,22}(t)C_{24}(t)P_{44}(t \mid t - T_{TTI})$ $(KCP)_{33}(t) = K_{f,31}(t)(C_{11}(t)P_{13}(t \mid t - T_{TTI}) + C_{12}(t)P_{23}(t \mid t - T_{TTI}) + C_{13}(t)P_{33}(t \mid t - T_{TTI})) + K_{f,32}(t)C_{24}(t)P_{34}(t \mid t - T_{TTI})$ $(KCP)_{34}(t) = K_{f,31}(t)(C_{11}(t)P_{14}(t \mid t - T_{TTI}) + C_{12}(t)P_{24}(t \mid t - T_{TTI}) + C_{13}(t)P_{34}(t \mid t - T_{TTI})) + K_{f,32}(t)C_{24}(t)P_{44}(t \mid t - T_{TTI})$ $(KCP)_{44}(t) = K_{f,41}(t)(C_{11}(t)P_{14}(t \mid t - T_{TTI}) + C_{12}(t)P_{24}(t \mid t - T_{TTI}) + C_{13}(t)P_{34}(t \mid t - T_{TTI})) + K_{f,42}(t)C_{24}(t)P_{44}(t \mid t - T_{TTI})$ $P_{11}(t \mid t) = P_{11}(t \mid t - T_{TTI}) - (KCP)_{11}(t)$
$P_{12}(t \mid t) = P_{12}(t \mid t - T_{TTI}) - (KCP)_{12}(t)$
$P_{13}(t \mid t) = P_{13}(t \mid t - T_{TTI}) - (KCP)_{13}(t)$
$P_{14}(t \mid t) = P_{14}(t \mid t - T_{TTI}) - (KCP)_{14}(t)$
$P_{22}(t \mid t) = P_{22}(t \mid t - T_{TTI}) - (KCP)_{22}(t)$
$P_{23}(t \mid t) = P_{23}(t \mid t - T_{TTI}) - (KCP)_{23}(t)$
$P_{24}(t \mid t) = P_{24}(t \mid t - T_{TTI}) - (KCP)_{24}(t)$
$P_{33}(t \mid t) = P_{33}(t \mid t - T_{TTI}) - (KCP)_{33}(t)$ -continued $$P_{34}(t \mid t) = P_{34}(t \mid t - T_{TTI}) - (KCP)_{34}(t)$$
$$P_{44}(t \mid t) = P_{44}(t \mid t - T_{TTI}) - (KCP)_{44}(t)$$
$$\hat{x}_1(t + T_{TTI} \mid t) = \hat{x}_1(t \mid t)$$
$$\hat{x}_2(t + T_{TTI} \mid t) = \hat{x}_2(t \mid t)$$
$$\hat{x}_3(t + T_{TTI} \mid t) = a\hat{x}_3(t \mid t)$$
$$\hat{x}_4(t + T_{TTI} \mid t) = \hat{x}_1(t \mid t)$$
$$P_{11}(t + T_{TTI} \mid t) = P_{11}(t \mid t) + R_{1,11}(t)$$
$$P_{12}(t + T_{TTI} \mid t) = P_{12}(t \mid t) + R_{1,12}(t)$$
$$P_{13}(t + T_{TTI} \mid t) = aP_{13}(t \mid t) + R_{1,13}(t)$$
$$P_{14}(t + T_{TTI} \mid t) = P_{11}(t \mid t) + R_{1,44}(t)$$
$$P_{22}(t + T_{TTI} \mid t) = P_{22}(t \mid t) + R_{1,22}(t)$$
$$P_{23}(t + T_{TTI} \mid t) = aP_{23}(t \mid t) + R_{1,23}(t)$$
$$P_{24}(t + T_{TTI} \mid t) = P_{12}(t \mid t) + R_{1,24}(t)$$
$$P_{33}(t + T_{TTI} \mid t) = a^2 P_{33}(t \mid t) + R_{1,33}(t)$$
$$P_{34}(t + T_{TTI} \mid t) = aP_{13}(t \mid t) + R_{1,34}(t)$$
$$P_{44}(t + T_{TTI} \mid t) = P_{11}(t \mid t) + R_{1,44}(t)$$
End. (42)

In (42) the fact that covariance matrices are symmetric has been used to eliminate 6 of 16 scalar sets of equations.

The final step is to compute the neighbor cell interference estimate as $$\hat{P}_{neighbor}(t|t) = \hat{x}_2(t|t) - \hat{P}_N(t|t), \quad (43)$$

The computational gain associated with the above example of vector estimation of neighbor cell interference will now be investigated in detail; it will be seen to be significant. For generality, the iterated EKF is treated. A standard EKF can be obtained by setting the number of iterations equal to 1.

Initially, the computational complexity of the iterated vector EKF will be analyzed. The operations needed in order to complete one update of the vector EKF, without computing scalar component estimators, and assuming that the filter is implemented using generic vector and matrix operations. Hence no advantage due to zero entries in vectors and matrices materialize in this case.

The following operations are needed—it is assumed that quantities are computed only once, re-used whenever possible, and that covariance symmetry is used when readily recognized:

State covariance matrix scaling: 1 divide, 6 multiply.

Output vector prediction: 1 addition, 1 multiply and add, 1 division.

Linearization of the measurements matrix: 1 addition, 1 multiply and add, 4 multiply, 1 divide.

Kalman Gain Matrix Computation $$C_i(t)P(t|t-T)C_i^T(t) + R_2(t):$$

3 addition, 44 multiply and add.

$$(C_i(t)P(t|t-T)C_i^T(t) + R_2(t))^{-1}:$$

1 multiply, 1 multiply and add, 3 divide.

$$P(t|t-T)C_i^T(t)(C_i(t)P(t|t-T)C_i^T(t) + R_2(t))^{-1}:$$

60 multiply and add.

State vector update: 2 subtract, 8 multiply and add.

Covariance matrix update: 10 addition, 64 multiply and add.

State vector prediction: 16 multiply and add.

Covariance matrix prediction: 10 addition, 104 multiply and add.

Summing up results in 20+4 additions, 2 subtractions, 6+5 multiplies, 185+98 multiply and adds, and 1+4 divisions.

Assuming equal weighting gives 326 arithmetic operations.

Turning now to the computational complexity of the iterated EKF reduced to scalar component estimation form in accordance with the above-described example. The corresponding count with all vector operations decomposed to scalar component estimations with superfluous operations removed is obtained by a study of the equation (42). The result is:

State covariance scaling: 1 divide, 6 multiply.

Output prediction: 1 addition, 1 multiply and add, 1 division.

Linearization of the measurements matrix: 1 addition, 1 multiply and add, 4 multiply, 1 divide.

Kalman gain computation: 3 addition, 2 subtract, 38 multiply, 21 multiply and add, 3 divide.

State update: 2 subtract, 8 multiply and add.

Covariance update: 10 addition, 40 multiply and add.

State prediction: 1 multiply and add.

Covariance prediction: 3 addition, 2 multiply, 3 multiply and add.

Summing up results in 14+4 additions, 2 subtractions, 9+42 multiplies, 45+47 multiply and adds, and 1+4 divisions. Assuming equal weighting gives 168 arithmetic operations.

The conclusion is that with the EKF, the scalar component estimator formulation reduces the computation complexity by about 50%.

Considering the real time complexity for each algorithm instance, results in 16800 arithmetic operations/second for 10 ms TTI, and 84000 arithmetic operations/second for 2 ms TTI. One algorithm instance is needed per cell. Hence the total processing need for one RBS will be less than 2-3 million arithmetic operations/second.

As stated above, the use a tabulation of transcendental functions $3a1$, is intended to reduce the computational complexity for processing circuitry that lack support for transcendental function evaluation. However, without details about hardware data, it is not possible to state any figures for the complexity reduction. In general, however, the transcendental function evaluation is replaced by 8-10 compares and table lookups and a total of about 5 additions or multiplies due to the linear interpolation.

A short discussion on simulation results will now follow.

A basis for data generation is a large set of uplink power files generated in a high fidelity system simulator. The files represent bursty traffic, with a varying mix of speech and data traffic, at different load levels.

These data files are then combined in different ways by a MATLAB code which generates the uplink UL power components, i.e. own cell traffic, inter-cell traffic, thermal noise and the summed up RTWP. The load factor of the own cell 4a is also computed. The simulater e.g. allows to:

- Select average power levels of the components, with respect to the thermal noise floor level
- Select a number of neighbors generating inter-cell interference.
- Select a load utilization probability of the own cell, fix or varying between two limits.
- Select a loop delay of the load factor (related to grant loop delay).
- Set daily load patterns, and perturb these day to day by a randomization algorithm.

A MATLAB reference code implementing the disclosed algorithm was used for performance simulations. Each run was 720000 10 ms TTIs i.e 2 h of traffic. The load utilization probability was varied. The variation was very fast with changes every few TTIs. The mean power levels of the neighbor cell interference and the own cell were also varied between simulations, as was the load factor bias.

Figures 7, 8:
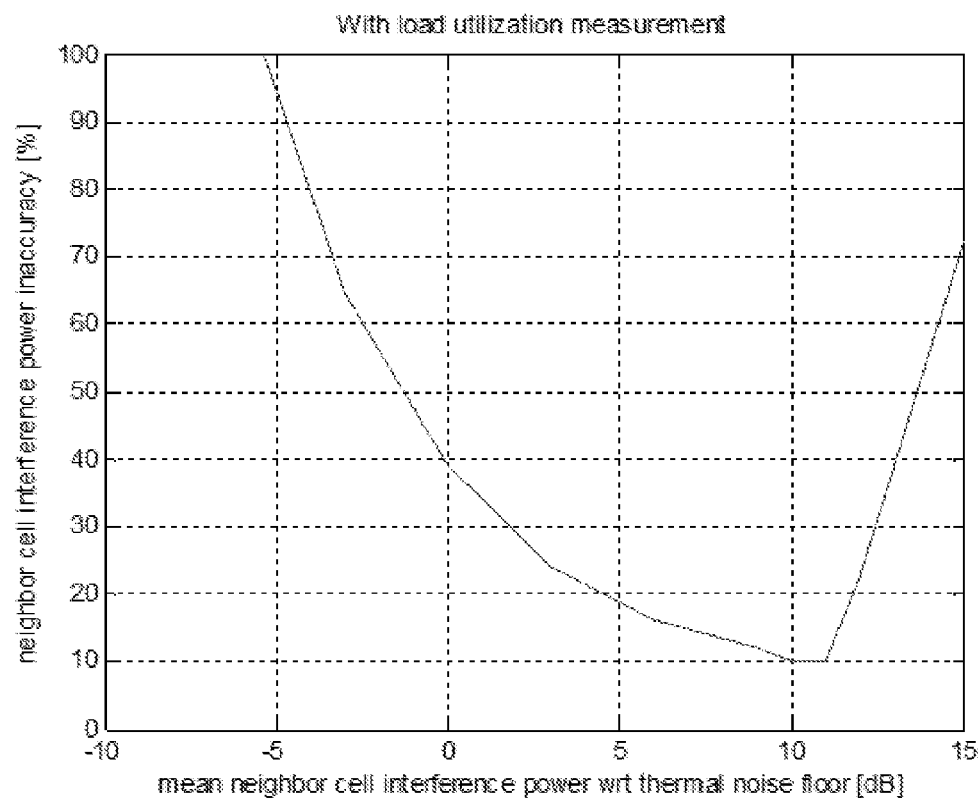
FIG. 7 is a diagram that plots an inaccuracy of a neighbor cell interference estimate as a function of mean neighbor cell interference power.
FIG. 8 is a table illustrating a result of simulations relating to a use of a coarse tabulation of computation support information.

Repeated simulations were then used to characterize the scalar component estimator performance. First, an accuracy of the neighbor cell interference estimate is addressed as a function of the involved power levels. FIG. 7 plots the inaccuracy of the neighbor cell interference estimate, as a function of the mean neighbor cell interference power. The scheduled mean own cell interference power is 5 dB above the thermal noise power floor level.

It is evident that a first factor that affects the inaccuracy is the signal to noise ratio of the neighbor cell interference in the simulated signals that are used for estimation of the neighbor cell interference power. The inaccuracy is reduced when the simulated neighbor cell interference grows on the expense of the own cell power. This is however true only up to a limit where the mean RoT becomes too high. Then the estimator has to work in a very steep region of the load curve, and above a certain level the estimation seems to become too sensitive, resulting in a rapidly increasing inaccuracy.

The result means that the accuracy of the scalar component estimators are good in the regions where neighbor cell interference is high and when it is affecting performance (well above the thermal noise power floor, and when it is large as compared to the own cell power). This holds up to interference levels of about 10 dB mean RoT. It should be noted that mean RoTs above 10 dB represent a very high load, with RoT peaks at least at 20-25 dB. Hence the results indicate that the estimator should be capable to provide useful estimates in the majority of the interference region of interest.

In order to illustrate the effect of coarse tabulation 3a2 simulation with and without coarse tabulation was performed for 6 cases, keeping the own cell mean power 3 dBs over the thermal noise power floor, and the neighbor cell interference 6 dB over the thermal noise power floor. Furthermore, the load utilization probability was between 0.6 and 0.9. The results are available in a table of FIG. 8.

As can be seen, there is no significant performance loss even when very coarse tabulation 3a2 is used. The thermal noise power floor estimation does however start to deteriorate for table sizes less than 256. For that reason 256 is a recommended table size.

Figure 9:
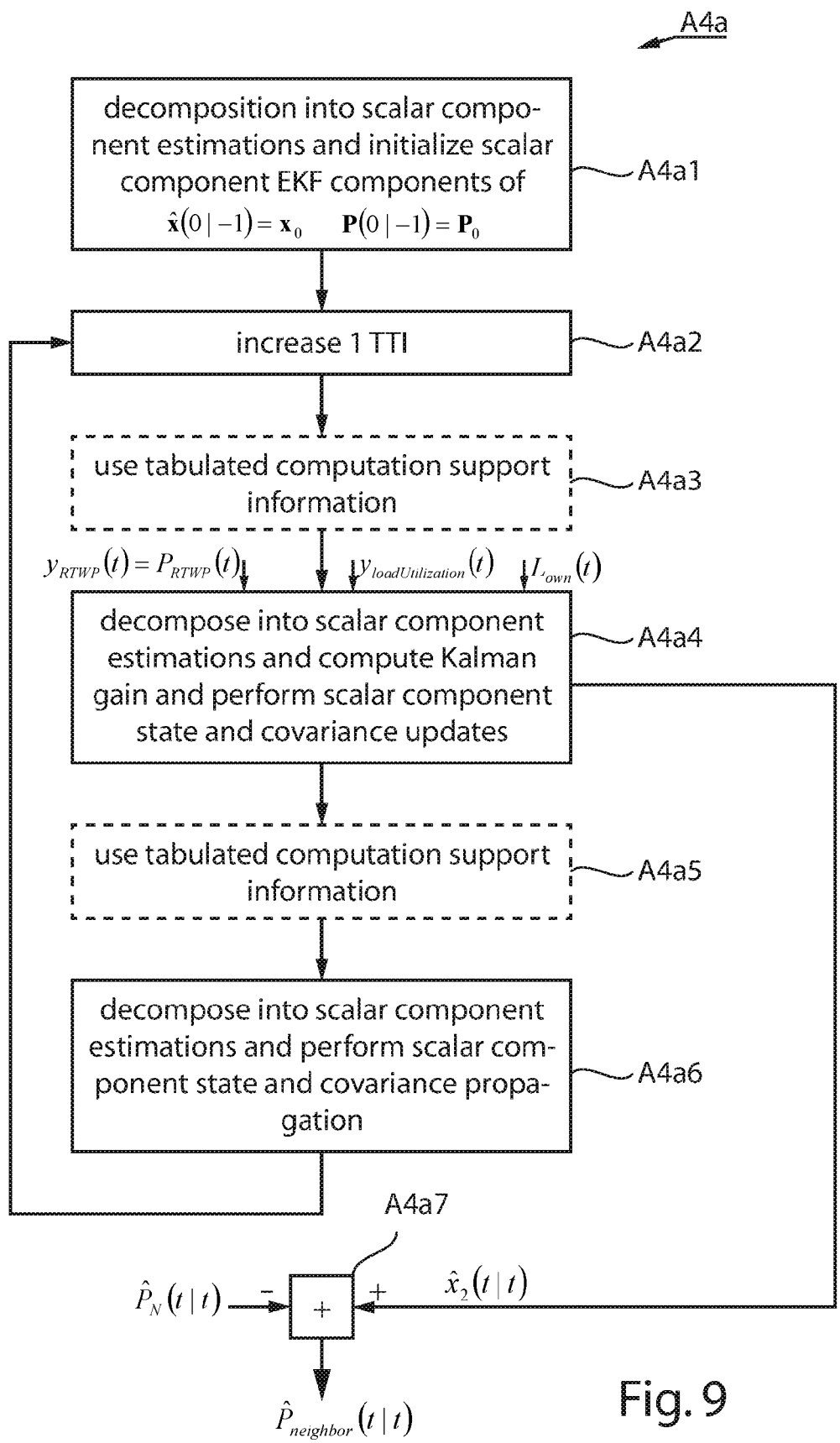
FIG. 9 is a flowchart illustrating, according to an implementation example, one way of performing a vector estimation of neighbor cell interference.

FIG. 9 is a flowchart that illustrates one exemplary way, herein referenced as A4a, of performing the vector estimation of neighbor cell interference according to the principles the above-discussed implementation examples.

The vector estimation A4a comprises an action A4a1 of scalar component decomposition which involves an initialization of a scalar component EKF with the components of $\hat{x}(0|-1)=x_0$ and $\hat{x}(0|-1)=x_0$.

The vector estimation A4a further comprises an action A4a2 of a time increase corresponding to one TTI.

The vector estimation A4a further comprises an action A4a3 (optional) of using tabulated computation support information 3 in the action A4a1.

The vector estimation A4a further comprises an action A4a4 of decomposition into scalar component estimations which involves a computation of the Kalman gain and performance of scalar component state and covariance updates. Here, $y_{RTWP}(t)=P_{RTWP}(t)$, $L_{own}(t)$ and $y_{loadUtilization}(t)$ are provided as input, and $\hat{x}_2(t|t)$ is output.

The vector estimation A4a further comprises an action A4a5 (optional) of using tabulated computation support information 3 in the action A4a4 and in as subsequent action A4a6.

The vector estimation A4a further comprises an action A4a6 of decomposition into scalar component estimations which involves a performance of a propagation of scalar component state and covariance.

The vector estimation A4a further comprises an action A4a7 of obtaining the neighbor cell interference estimate as $$\hat{P}_{neighbor}(t|t)=\hat{x}_2(t|t)-\hat{P}_N(t|t).$$

After the action A4a6 the method may return to action A4a2 for a further iteration.

Figure 10:
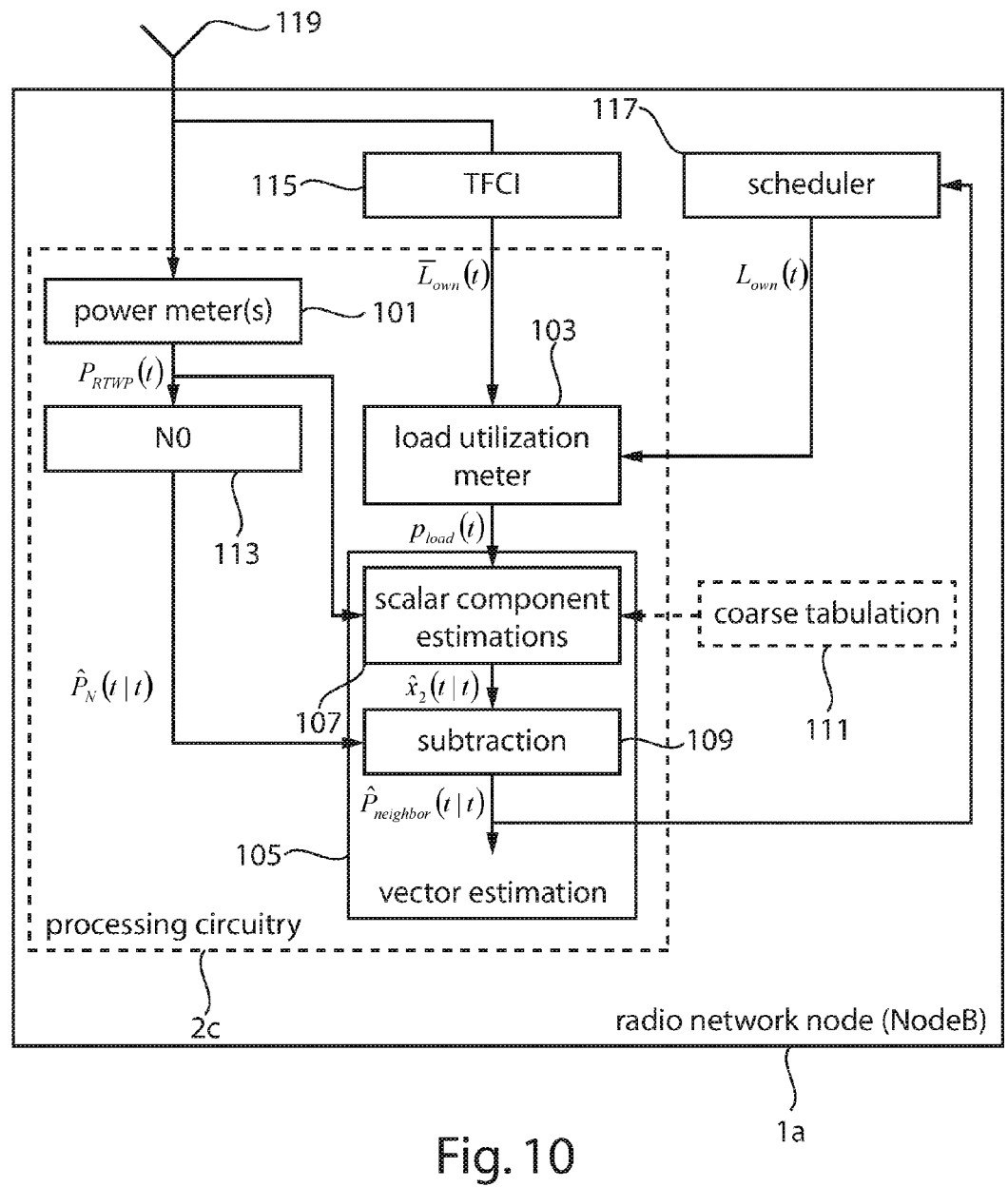
FIG. 10 is block diagram illustrating a radio network for a cellular communication network, where the radio node is configured for applying vector estimation of neighbor cell interference in accordance with teachings of implementation examples.

FIG. 10 is block diagram illustrating a radio network node 1a specifically suitable for applying vector estimation of neighbor cell interference in accordance with some of the implementation examples presented earlier. The radio network node 1a may be a radio base station, for example, a NodeB of a WCDMA cellular system. The radio network node 1a comprises processing circuitry 2c. The processing circuitry 2c comprises at least one power meter 101 configured to measure a received total wideband power $P_{RTWP}(t)$ based on signals received from an antenna 119 via a radio unit (not shown). The processing circuitry 2c further comprises a load utilization meter 103 configured to measure a load utilization probability $P_{load}(t)$ based on measured load factors $\Gamma_{own}(t)$ and computed load factors $L_{own}(t)$ received from a TFCI decoder 115 and a scheduler 115, respectively. The processing circuitry 2c further comprises circuitry 105 for performing vector estimation of neighbor cell interference. The circuitry 105 comprises circuitry 107 configured to implement decompositions into scalar component estimations which may involve scalar component EKF interference estimation, as described above. The circuitry 107 is configured to use $p_{load}(t)$ and $P_{RTWP}(t)$ as input and to output the estimate $\hat{x}_2(t|t)$, which, as before, is an estimate of a sum of neighbor cell interference and thermal noise. The circuitry 105 further comprises a subtraction unit 109 configured to calculate an estimate of neighbor cell interference $\hat{P}_{neighbor}(t|t)$ as $$\hat{P}_{neighbor}(t|t)=\hat{x}_2(t|t)-P_N(t|t).$$

Here $\hat{P}_N(t|t)$ is a noise floor estimate which is provided by a noise floor estimator 113 comprised in the processing circuitry 2c. The noise floor estimator 113 is configured to generate $\hat{P}_N(t|t)$ based on $P_{RTWP}(t)$ provided by the power meter(s) 101. Moreover, in this example, the estimate $\hat{P}_{neighbor}(t|t)$ is further provided as input to the scheduler 117 which may therefore base its scheduling of uplink communications on this estimate. Optionally, the circuitry 105 may also be configured to use a tabulation of computation support information to facilitate computations. Here, by way of example, the tabulation may be a coarse tabulation 111 of one or more transcendental functions.

In exemplary embodiments, the blocks depicted in FIG. 10 may be located in a base band unit of the radio network node 1a.

Above, the invention has been illustrated with various exemplary embodiments. These embodiments are intended solely as examples, and the scope of protection is instead defined by the appending claims.

The invention claimed is:

1. A method for interference handling performed in a radio network node for a cellular communication network, the method comprising:
   measuring a received total wideband power, RTWP, experienced at the radio network node;
   measuring a load utilization experienced at the radio network node; and
   performing vector estimation of neighbour cell interference experienced at the radio network node based on the measured RTWP and the measured load utilization, the vector estimation comprising decomposition into at least two scalar component estimations.

2. The method according to claim 1, wherein the method comprises:
   obtaining tabulated computation support information; and
   using the tabulated computation support information when performing the vector estimation.

3. The method according to claim 2, wherein the tabulated computation support information comprises a tabulation of at least one transcendental function.

4. The method according to claim 3, wherein the tabulation of at least one transcendental function comprises tabulation of at least: one or more logarithmic functions, one or more power functions or one or more exponential functions, or one or more functions based thereon.

5. The method according to claim 3, wherein a number of tabulation entries for the at least one transcendental function are restricted below a limit.

6. The method according to claim 5, wherein the limit is 256 entries or less.

7. A radio network node for a cellular communication network, the radio network node comprising processing circuitry, wherein:
   the processing circuitry is configured to measure a received total wideband power, RTWP, experienced at the radio network node;
   the processing circuitry is configured to measure a load utilization experienced at the radio network node; and
   the processing circuitry is configured to perform a vector estimation of neighbour cell interference experienced at the radio network node based on the measured RTWP and the measured load utilization such that the vector estimation comprises a decomposition into at least two scalar component estimations.

8. The radio network node according to claim 7, wherein:
   the processing circuitry is configured to obtain tabulated computation support information; and
   the processing circuitry is configured to use the tabulated computation support information during performance of the vector estimation.

9. The radio network node according to claim 8, wherein the tabulated computation support information comprises a tabulation of at least one transcendental function.

10. The radio network node according to claim 9, wherein the tabulation of at least one transcendental function comprises tabulation of at least: one or more logarithmic functions, one or more power functions or one or more exponential functions, or one or more functions based thereon.

11. The radio network node according to claim 9, wherein a number of tabulation entries for the at least one transcendental function (3a1) are restricted below a limit.

12. The radio network node according to claim 11, wherein the limit is 256 entries or less.

* * * * *